Patented Mar. 12, 1940

2,193,760

UNITED STATES PATENT OFFICE

2,193,760

METHOD FOR MANUFACTURING ALKYL PHENOLS

Robert R. Dreisbach, Edgar C. Britton, and Ralph P. Perkins, Midland, Mich., assignors to The Dow Chemical Company, Midland, Mich., a corporation of Michigan No Drawing. Application January 18, 1937, Serial No. 121,168

9 Claims. (Cl. 260—624)

This invention concerns a new method of manufacturing alkyl phenols, particularly meta-alkyl phenols, as well as certain new compounds made by such method.

A number of methods for manufacturing ortho- and para-alkyl phenols are well known, but the methods heretofore known for the manufacture of meta-alkyl phenols have involved certain operating difficulties such as the separation of isomeric halo-alkyl benzenes boiling at approximately the same temperature, the employment of a large number of chemical operations and chemical reagents, etc., which have rendered such processes unsuited to commercial practice. Since the meta-alkyl phenols are adapted to a wide variety of uses, e. g., as germicides, insecticides, chemical reagents for the preparation of synthetic resins, etc., an economical method for their manufacture is to be desired.

We have discovered that a mixture of isomeric mono-alkyl phenols rich in the meta-isomer may be prepared readily and at low cost by first alkylating a halo-benzene to produce a mixture consisting largely of the meta-alkyl halo-benzene along with a minor proportion of the ortho-isomer and occasionally some para-alkyl halo-benzene and thereafter hydrolyzing such mixture to produce the corresponding alkyl phenols which are separated by conventional procedure, e. g., distillation and fractional crystallization. By employing a butylene or secondary- or tertiary-butyl halide as the alkylating agent in the process, a new compound, i. e., meta-secondary- or meta-tertiary-butyl phenol, may be obtained. Each of said new compounds possesses a high phenol coefficient and may be employed as a germicide and disinfectant. They are also useful as intermediate products from which a variety of other products, e. g., resins, etc., may be prepared. The invention, then, consists in the method and new compounds hereinafter fully described and particularly pointed out in the claims.

In preparing alkyl phenols by the present method a halo-benzene, e. g., chlorobenzene or bromobenzene, is first alkylated by reaction with an olefine or an alkyl halide, e. g. ethylene, propylene, butylene, isobutylene, amylene, ethyl chloride, isopropyl chloride, tertiary-butyl chloride, isobutyl chloride, etc., in the presence of a Friedel-Craft catalyst, such as aluminum chloride. This reaction is carried out in accordance with conventional procedure using the catalyst in a proportion representing preferably between 0.05 and 5 per cent the weight of the halo-benzene, and gradually adding the olefine or alkyl halide to a mixture of the halo-benzene and catalyst, while stirring and maintaining the mixture at temperatures between 0° and 100° C. When a mono-alkyl phenol is the product desired, the olefine or alkyl halide is added in amount representing preferably between 0.75 and 1.0 molecular equivalent of the halo-benzene. When a poly-alkyl phenol is desired, the olefine or alkyl halide is added in greater proportion. After completion of this reaction, the catalyst is removed or rendered inactive, e. g. by adding a base such as sodium hydroxide or sodium carbonate and filtering or by extraction with aqueous hydrochloric acid, etc., after which the mixture is distilled to separate undesired homologues and alkyl halo-benzenes from the desired mixture of isomeric halo-benzene products. Irrespective of whether the latter is a mixture of isomeric mono-alkyl halo-benzenes or isomeric poly-alkyl halo-benzenes, it will in all instances contain a high proportion of an isomer having an alkyl substituent in the meta position relative to the halogen substituent.

The mixture of isomeric alkyl halo-benzenes is then hydrolyzed, preferably by heating the same under pressure in a closed reactor with an aqueous solution of an alkali, such as sodium hydroxide, sodium carbonate, lime, etc. The temperature at which the hydrolysis is carried out is somewhat dependent upon the particular alkyl halo-benzene undergoing treatment. In general, the alkyl-chlorobenzenes are hydrolyzed at temperatures between 250° and 375° C. and the alkyl-bromobenzenes may be hydrolyzed at somewhat lower temperatures, e. g., 200°–300° C. The hydrolysis is preferably carried out in a bomb or autoclave lined with copper, since molecular rearrangements tend to occur when it is carried out in an iron reactor. However, it may be carried out in equipment constructed of iron or other suitable material to obtain a mixture of isomeric alkyl-phenols containing a large proportion of the isomer having an alkyl group in the meta position with respect to the hydroxyl radical.

After completion of the reaction, which usually requires from two to six hours of heating, the reactor is cooled and the charge removed therefrom. Any water-insoluble organic material contained in the reacted mixture is separated, after which the aqueous layer of the mixture is acidified, e. g., with sulphuric or hydrochloric acid, extracted with an organic solvent such as benzene, chlorobenzene, ortho-dichlorobenzene, etc., and the extract is distilled. By careful fractionation during the distillation, the ortho-alkyl phenol product may be collected directly and in substantially pure form; and the meta-alkyl phenol may likewise be collected in pure form when its para-isomer, which boils at approximately the same temperature, is not present in the mixture under treatment. However, in those instances when a mixture of all three isomers is produced by the hydrolysis, the pure ortho-alkyl phenol and a mixture of the meta- and para-alkyl phenols are obtained by the distillation, after which the meta- and para-isomers are separated either by crystallization from an organic solvent, such as benzene or chlorobenzene, or by fractional crystallization of their alkali or alkaline earth metal salts from water.

The following examples illustrate a number of ways in which the principle of the invention has been applied, but are not to be construed as limiting the invention.

*Example 1*

A total of 6 gram moles of cyclohexene was added gradually and with stirring to a solution of 0.3 gram mole of aluminum chloride in 30 gram moles of chlorobenzene, while maintaining the mixture at temperatures between 30° and 40° C. The time required for the addition was approximately 2.5 hours. The mixture was washed successively with an aqueous hydrochloric acid solution and water and dried. It was then fractionally distilled, whereby the mono-cyclohexyl-chlorobenzene product was separated in 64.8 per cent of the theoretical yield. A mixture of 642 grams (3.5 moles) of the mono-cyclohexyl-chlorobenzenes, 429 grams (10.7 moles) of sodium hydroxide, 2900 cubic centimeters of water, and 20 grams of cuprous oxide was heated in a copper-lined rotating bomb at 280°–290° C. for 6 hours, after which the bomb was cooled to 80° C. and the charge removed. A small proportion of water-insoluble organic material was separated from the hot reaction mixture, which was then cooled sufficiently to crystallize therefrom sodium para-cyclohexyl-phenate, the latter being separated by filtration. The sodium para-cyclohexyl-phenate was then acidified with hydrochloric acid, the phenol separated and distilled. There was obtained 177 grams (1.003 moles) of substantially pure para-cyclohexyl-phenol. The aqueous solution remaining after separation of the para-cyclohexyl-phenol from the hydroylsis mixture was acidified with hydrochloric acid and the phenols liberated thereby were extracted from the solution with benzene, after which the extract was distilled. There were obtained 119 grams (0.675 mole) of ortho-cyclohexyl-phenol, 158 grams (0.899 mole) of meta-cyclohexyl-phenol, and 29.6 grams (0.168 mole) of para-cyclohexyl-phenol.

*Example 2*

6 gram moles of cyclohexyl-chloride was added in approximately 3 hours to a solution of 0.3 gram mole of aluminum chloride in 30 gram moles of chlorobenzene while stirring and maintaining the reaction mixture at temperatures between 24° and 32° C. The mixture was washed successively with aqueous hydrochloric acid and water and dried. It was then fractionally distilled, whereby 766.2 grams (3.94 moles) of a mixture of isomeric mono-cyclohexyl-chlorobenzenes was separated. 642 grams (3.3 moles) of the mono-cyclohexyl-chlorobenzene mixture obtained by such procedure was hydrolyzed to the corresponding phenols and the latter were collected as in Example 1. There were obtained 108 grams (0.609 mole) of ortho-cyclohexyl-phenol, 214 grams (1.212 moles) of meta-cyclohexyl-phenol, and 171 grams (0.972 mole) of para-cyclohexyl-phenol.

*Example 3*

Approximately 0.75 pound mole of ethylene was introduced in 6 hours into a mixture of 0.03 pound mole of aluminum chloride and 1 pound mole of chlorobenzene while maintaining the reaction mixture at approximately 70° C. under a pressure of about 70 pounds per square inch, gauge. The reacted mixture was treated with aqueous sodium hydroxide, filtered and the filtrate was fractionally distilled to separate a mixture of ortho-ethyl- and meta-ethyl-chlorobenzenes boiling at approximately 190°–195° C. at atmospheric pressure, which mixture contained approximately 20 per cent of the ortho-isomer and approximately 80 per cent of the meta-isomer. 3632 grams (25.8 moles) of said mixture of ortho- and meta-chloro-ethylbenzenes was hydrolyzed with aqueous sodium hydroxide in a copper-lined autoclave, the procedure being similar to that described in Example 1. The reacted mixture was acidified with hydrochloric acid, extracted with benzene and the extract was fractionally distilled. There was obtained 547 grams (4.5 moles) of ortho-ethylphenol distilling at approximately 203°–206° C. and 2026 grams (16.6 moles) of meta-ethylphenol distilling at 214°–217° C.

*Example 4*

Approximately 2.3 pound moles of ethylene was introduced in 4 hours, 10 minutes, into a mixture of 1 pound mole of chlorobenzene, and 0.1 pound mole of aluminum chloride, while heating the mixture to approximately 80° C., under an applied pressure of about 80 pounds per square inch gauge. The reacted mixture was then cooled, treated with aqueous sodium hydroxide, and filtered. The filtrate was distilled and the fraction boiling at 216°–219° C., collected. This fraction consisted of 0.09 pound mole of diethyl-chlorobenzene. A mixture of 0.238 gram mole of the diethyl-chlorobenzene, 0.6 gram mole of sodium hydroxide, 214 grams of water, and 2 grams of cuprous oxide was heated to 250° C. for 3 hours in a rotating copper bomb, after which the bomb was cooled and the charge removed. The reacted mixture separated on standing into an aqueous and an oily layer. The aqueous layer was separated, washed thoroughly with benzene, filtered, and then acidified with hydrochloric acid to liberate the phenol product. The latter was separated by usual procedure, e. g., extraction with a solvent such as chlorobenzene, and distilled. The diethyl-phenol product so obtained was a colorless liquid boiling at 235°–240° C. at atmospheric pressure and having a specific gravity of 0.9833 at 25°/25° C. It remained liquid at temperatures as low as −25° C.

*Example 5*

Secondary-butyl-bromobenzene was prepared by reacting secondary butyl chloride with bromobenzene in the presence of aluminum chloride, thereafter neutralizing the reacted mixture, and separating the product by distillation. The secondary-butyl-bromobenzene product boiled at approximately 232°–233° C., under 745 millimeters pressure and consisted largely of the meta-compound along with a minor proportion of the ortho-isomer. It was hydrolyzed by heating under pressure with aqueous sodium hydroxide and the resultant secondary butyl phenol product was separated as in Example 4. The product was a colorless liquid boiling at approximately 237.5°–240° C., under 747 millimeters pressure and having a specific gravity of 1.5181 at 25°/25° C. It did not freeze at -5° C. The product consisted largely of the new compound, meta-secondary-butyl-phenol, having the formula:

*Example 6*

Tertiary-butyl-chlorobenzene was prepared by condensing isobutyl chloride with chlorobenzene in the presence of aluminum chloride. The product, which consisted largely of meta-tertiary-butyl-chlorobenzene, boiled at 209°–210° C. under 743 millimeters pressure. This product was hydrolyzed to the corresponding phenol and the latter was purified as in Example 4. The phenolic product was a mixture of approximately 70 per cent meta- and 30 per cent ortho-tertiary-butyl-phenol, boiling at 239°–240° C. at 742 millimeters pressure, freezing at approximately 19.5° C., and having a specific gravity of 0.9804 at 25° C. Substantially pure meta-tertiary-butyl-phenol, freezing at approximately 40.5°–41° C. and having the formula:

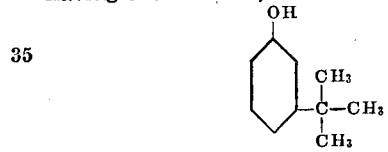

was separated by fractionally crystallizing the mixture of ortho- and meta-tertiary-butyl-phenols.

*Example 7*

Meta-tertiary-butyl-phenol was prepared as in Example 6, except that tertiary-butyl chloride, instead of isobutyl chloride, was employed to alkylate the chlorobenzene.

Other meta-alkyl phenols may be prepared by similar procedure. For instance, propylene may be condensed with bromobenzene in the presence of aluminum chloride or aluminum bromide to produce a mixture of isopropyl-bromobenzenes rich in the meta-isomer, which mixture of isopropyl-bromobenzenes may be hydrolyzed to produce the corresponding isopropyl-phenols, the meta-isopropyl-phenol being obtained as the major product.

In general, the alkyl phenols produced by condensing an olefine higher than ethylene with a halo-benzene and subsequently hydrolyzing the product are mixtures of secondary- or tertiary-alkyl-phenols, rich in the meta-isomer, and those obtained by employing a primary-, secondary-, or tertiary-alkyl halide as the agent for alkylating the halo-benzene are primary-, secondary-, or tertiary-alkyl-phenols, also rich in the meta-isomer.

As hereinbefore indicated, the step of hydrolyzing a meta-alkyl-halo-benzene to produce the corresponding phenol is preferably carried out under pressure in the presence of an aqueous alkali as the hydrolyzing agent. The invention, however, is not limited to such procedure, since the hydrolysis may, if desired, be effected in other ways. For instance, it may, in some instances, be accomplished by passing a vapor mixture of steam and the alkyl-halo-benzene over a porous surface catalyst, such as silica gel, calcium phosphate, etc., heated to a temperature above 350° C. and preferably between 450° and 550° C. Such vapor phase hydrolysis may be carried out at atmospheric, reduced, or increased pressures and is promoted by mixing a vaporized copper salt, e. g., $Cu_2Cl_2$, with the reaction vapors prior to or during contact of the latter with the porous surface catalyst.

Other modes of applying the principle of the invention may be employed instead of those explained, change being made as regards the method or compounds herein disclosed, provided the steps or compounds stated by any of the following claims or such stated steps or compounds be employed.

We therefore particularly point out and distinctly claim as our invention:

1. A meta-branched-chained butyl-phenol.
2. Meta-secondary-butyl-phenol.
3. Meta-tertiary-butyl-phenol.
4. The method which comprises alkylating a halo-benzene by reacting the latter in the presence of a Friedel-Craft catalyst with an agent of the class consisting of olefines and alkyl halides to produce a meta-alkyl-halo-benzene and subsequently hydrolyzing the latter to form the corresponding meta-alkyl-phenol.
5. The method which comprises reacting an olefine with a halo-benzene in the presence of a Friedel-Craft catalyst to produce a mixture of mono-alkyl-halo-benzenes rich in the meta-isomer and subsequently hydrolyzing said mixture of isomeric mono-alkyl-halo-benzenes in a reactor lined with copper to produce a mixture of the corresponding alkyl-phenols.
6. The method which comprises reacting an alkyl halide with a halo-benzene in the presence of a Friedel-Craft catalyst to produce a mixture of mono-alkyl-halo-benzenes rich in the meta-isomer and subsequently hydrolyzing said mixture of isomeric mono-alkyl-halo-benzenes in a reactor lined with copper to produce a mixture of the corresponding alkyl-phenols.
7. The method which comprises alkylating a halo-benzene by reacting the latter in the presence of a Friedel-Craft catalyst with an agent of the class consisting of olefines and alkyl halides to form a mixture of isomeric alkyl-halo-benzenes rich in the meta-isomer, hydrolyzing said mixture of alkyl-halo-benzenes to produce a mixture of alkyl-phenols rich in the meta-isomer and separating the meta-alkyl-phenol as an individual compound.
8. The method which comprises reacting cyclohexene with chlorobenzene in the presence of aluminum chloride to form a mixture of isomeric cyclohexyl-chlorobenzenes rich in the meta-isomer, hydrolyzing said mixture of isomeric cyclohexyl-chlorobenzenes in a copper-lined reactor to produce a mixture of the corresponding isomeric cyclohexyl-phenols.
9. The method which comprises reacting a cyclohexyl halide with chlorobenzene in the presence of aluminum chloride to form a mixture of isomeric cyclohexyl-chlorobenzenes rich in the meta-isomer, hydrolyzing said mixture of isomeric cyclohexyl-chlorobenzenes in a copper-lined reactor to produce a mixture of the corresponding isomeric cyclohexyl-phenols.

ROBERT R. DREISBACH.
EDGAR C. BRITTON.
RALPH P. PERKINS.